UNITED STATES PATENT OFFICE.

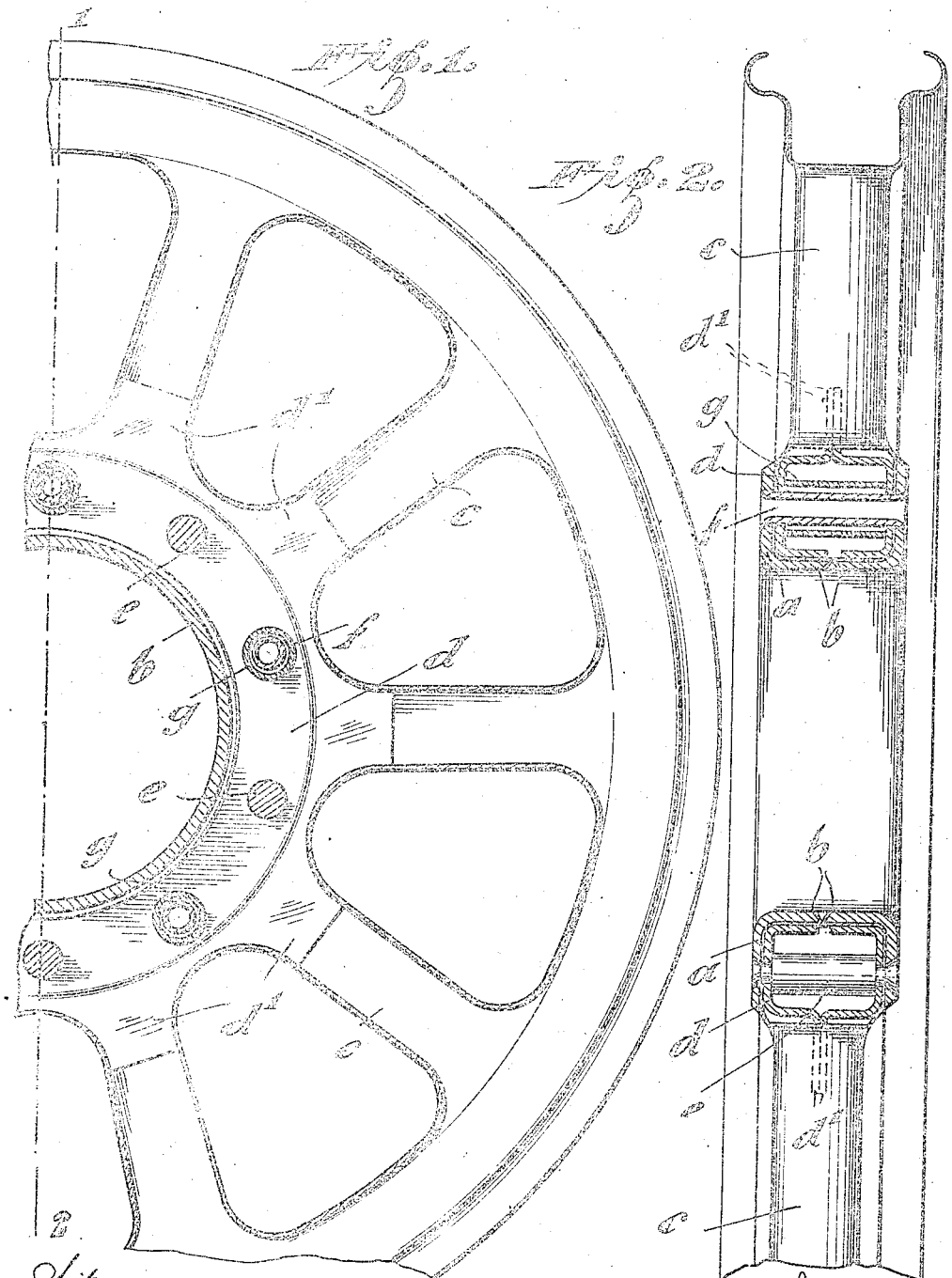

ERNEST FREDERICK GOODYEAR, OF DUDLEY, ENGLAND.

WHEEL FOR AUTOMOBILES AND THE LIKE.

1,211,572.  Specification of Letters Patent.  Patented Jan. 9, 1917.

Application filed October 17, 1914. Serial No. 867,142.

*To all whom it may concern:*

Be it known that I, ERNEST FREDERICK GOODYEAR, a subject of the Kingdom of Great Britain, residing at Reliance Works, Dudley, in the county of Worcester, England, manufacturer, have invented certain new and useful Improvements in Wheels for Automobiles and the like, of which the following is a specification.

This invention comprises certain improvements in or relating to wheels, such as the road wheels of automobiles and the like, and is particularly applicable to the type of wheel in which two sheaves or half members are used in building up the wheel, said sheaves or half members being jointed or connected together at substantially the central plane of the wheel. In such an arrangement the two main sheaves each forming or relating to one half of the wheel, have in the finished wheel the semi-spoke formation, the semi-channel formation at the circumference, and a suitable formation at or near the center pressed or suitably incorporated, after which the sectors between the spokes are advantageously removed.

It is desirable to construct that part of the wheel in the vicinity of the hub of the greatest possible strength, whereby it is enabled to efficaciously counteract side strains such as occur as for instance in skidding, or when the wheel runs laterally into the curb.

In manufacture of the wheel and in the process of bolting the hub portions to the wheel proper, the sides of the wheel, or of the sheet metal portions thereof, are apt to become indented at the points at which the pressure from the nuts or heads of the bolts is received.

The present invention has for its purpose to improve, strengthen, and render altogether more satisfactory the construction of this part of the wheel.

According to the present invention I incorporate in connection with the hub part of the wheel strengthening members adapted to occupy positions in external relation to the sheet metal portions, said strengthening members being effectively connected to the sheet metal portions at their inner edges, and being of a character whereby a particularly substantial foundation is provided for the reception of the pressure of the bolt heads and nuts.

Further, according to the present invention, I incorporate within the central portion of the wheel, annular sheet metal liners. These liners advantageously have portions extending into the spoke formations, the portions of the liners extending into the spokes having the effect of preventing creeping of the wheel sheaves in relation to the liners, or vice versa. The liners assist in preventing compression or indentation of the sheet metal of the sheaves or half wheels by the bolts which are passed through the wheel, and as an additional means of preventing such compression or indentation, shouldered rivets, or tubular distance pieces or both are incorporated within the sheet metal liner, which latter is advantageously assembled in two halves, the division occurring at the mid-plane of the wheel.

In order that this invention may be clearly understood, and readily carried into practice, reference may be had to the appended explanatory sheet of drawings, upon which:—

Figure 1 is a sectional elevation of a wheel constructed according to the present invention, the plane of section occurring at the mid-plane of the wheel. Fig. 2 illustrates a section of the wheel shown in Fig. 1, the plane of section being on the line 1—2.

In a convenient embodiment of the present invention, in manufacturing the sheaves or halves $c$ $c$ a central perforation is not formed, but a cupped depression is centrally formed of such depth that its closed extremity corresponds with the mid-plane of the wheel so that when the two halves of the wheel are brought together the closed extremities of the cupped portions are in contact with each other. I then provide in connection with each half or side of the wheel, a strengthening member $a$ in the nature of an annulus of substantially angle or L formation in cross section in such a manner that two flanges are provided, one a substantially cylindrical flange adapted to project into the cupped depression, and the other a flange at right angles thereto adapted to lie against the face of the wheel.

The inner extremities of the strengthening members *a a* may be beveled or inclined from the mid-plane of the wheel in a direction away from the circular walls of the cupped formation in the sheave members and the central parts of such cup members may now be perforated or cut away in such a manner that annular sheet metal flanges *b* are provided of width corresponding substantially with the thickness of the metal of the strengthening members *a*.

Such flanged edges *b* of the sheet metal members *c, c* occurring between the beveled edges of the strengthening members *a a* may be welded together and to the strengthening members by any suitable welding process, whereby the strengthening members are effectively and integrally connected to the sheet metal members at the midplane of the wheel.

*d d* are the halves of a box-like annular sheet metal liner assembled within the central part of the wheel, each half member *d* being furnished with extensions *d¹* adapted to project into the spokes to prevent rotary movement of said liner in relation to the wheel. Within said box-like liner, and at intervals around the circumference, shouldered rivets *e* may be incorporated, which may serve to secure together the sheaves *c*, strengthening members *a*, and liner sections *d*. At points intermediate to the shouldered rivets *e*, tubular members *f* may be incorporated, said members being adapted to provide holes passing through the finished wheel to permit of the assemblage therethrough of the bolts for securing the wheel. The extremities of such tubular members *f* may be enlarged or burred outwardly to engage with the countersunk perforations in the strengthening members *a a*, and around such tubular members *f* tubular distance members *g* may be incorporated within the box-like liners. The perforations in the walls of the liner *d d* for accommodating the tubular member *f* may be formed by drifting or otherwise perforating the metal in such a manner that an inturned edge is provided around the perforation and encircling the tubular member *f*. This inturned edge takes within the extremity of the tubular member *g*, thereby assisting to keep the latter in place.

The welding operation carried on at the inner extremities of the strengthening members *a* has the effect of welding together the inner edges of the sheaves, and also the inner edges of the liner sections. The welding together of the sheaves around the spaces between the spokes has the effect of also welding together the outer edges of the liners, by which operation the liners and sheaves, as also the strengthening members are effectively welded together.

The central aperture in a wheel so constructed may be afterward machined internally to an accurate cylindrical surface into which the hub or hub portion proper may be inserted to provide an effective frictional fit or grip between the hub proper and the wheel with its strengthening members.

By the present invention, it is therefore possible in a sheet metal wheel to provide for a satisfactory process of internally machining the central aperture whereby an effective fit between the hub and the wheel may be obtained, while by the strengthening members and by their effective connection at their outer edges with the sheet metal of the wheel, a particularly satisfactory construction is obtained permitting of an efficacious bolting of the parts together, and whereby strength and durability is obtained in the finished wheel.

What I claim as my invention and desire to secure by Letters Patent is:—

1. A wheel for automobiles and the like comprising in combination two sheaves or half members, the inner edges of said sheaves extending inwardly toward each other to the mid-plane of the wheel, and having flanges at said mid-plane, strengthening members for said sheaves provided with beveled inner edges, said beveled edges being separated by said flanges and being welded thereto, the said strengthening members having plate portions contiguous to the faces of the wheel and adapted to counteract indentation or compression of the central portion of the wheel.

2. A wheel comprising in combination two sheaves or half members, a box-like annular liner assembled in halves within the central part of the wheel, the halves of the wheel and of said box-like liner being welded together whereby the liner is welded to the wheel, said liner having extensions projecting into the spoke portions of the wheel.

3. A wheel for automobiles and the like comprising in combination a pair of sheaves or half members, bushes connecting the halves of the wheel, and distance pieces encircling said bushes, said bushes being adapted to permit the passage therethrough of fastening bolts or the like.

4. A wheel for automobiles and the like comprising in combination a pair of sheaves or half members, bushes connecting the halves of the wheel, and distance pieces encircling said bushes, said bushes being adapted to permit the passage therethrough of fastening bolts or the like, additional members near the center of the wheel for increasing the thickness thereof, and shouldered rivets for holding the parts together.

5. A wheel comprising in combination two sheaves or half members, a box-like annular liner assembled in halves within the central part of the wheel, the halves of the wheel and of said box-like liner being welded together at portions of their inner edges and also at portions of their outer edges, whereby the liner is welded to the wheel, said liner having extensions projecting into the spoke portions of the wheel.

In witness whereof I have hereunto set my hand in the presence of two witnesses.

ERNEST FREDERICK GOODYEAR.

Witnesses:
ARTHUR H. BROWN,
HOLLIS F. BROWN